Patented Feb. 29, 1944

2,343,092

UNITED STATES PATENT OFFICE 2,343,092

TREATMENT OF TEXTILES AND COMPOSITION USEFUL THEREFOR

Joseph Edward Smith, Wilmington, Del., assignor to E. I. du Pont de Nemours & Company, Wilmington, Del., a corporation of Delaware No Drawing. Application August 3, 1940,
Serial No. 351,086

15 Claims. (Cl. 260—27)

This invention relates to mixed resins prepared by dissolving resinous materials in monomeric liquids capable of polymerization and polymerizing, and more particularly to mixed resins prepared by dissolving resinous materials in monomeric methacrylic acid esters or vinyl alcohol esters and polymerizing, and still more particularly to dispersions of the above resins substantive to silk, wool and nylon.

This invention has as an object the preparation of stable dispersions of mixed polymers which are substantive to silk, wool and nylon. A further object is the preparation of stable dispersions of mixed polymers of methacrylic acid esters and vinyl alcohol esters with resins soluble in the ester monomer, prepared with partially saponified polyvinyl acetate as dispersing agent and substantive to silk, wool and nylon. Other objects will appear hereinafter.

These objects are accomplished by the following procedure. A partially or fully polymerized resin polymer selected from either natural or synthetic resins is dissolved together with a small amount of benzoyl peroxide in liquid polymerizable conjugated compounds. The solution of the resin is agitated vigorously with a solution in water of a partially saponified polyvinyl acetate. During agitation, a positive charge is obtained on the emulsion particles by incorporating a polyvalent metal salt or a heavy metal salt together with an acid in the emulsion. The emulsion is heated to produce polymerization of the ester monomer and form a stable dispersion of the resulting resin. The dispersion is substantive from a dilute aqueous suspension to animal fibers, including wool and silk, and to nylon. As an alternative method, the heavy metal salt or multivalent metal salt may be added after the polymerization step to obtain a positively charged dispersion substantive to animal fibers and to nylon.

Aqueous dispersions of polymeric esters of methacrylic acid and vinyl alcohol have been prepared by emulsion polymerization. However, the preparation of mixed polymer dispersions obtained by dissolving a highly soluble natural or synthetic resin in a methacrylic acid or vinyl alcohol ester monomer, followed by emulsification and polymerization is not known.

Emulsifying and dispersing agents used in prior work for emulsion polymerization include typical anionic surface active agents as alkyl naphthalene sulfonic acid salts and fatty alcohol sulfates, as well as such protective colloids as natural gums, starches, and gelatin. Dispersions prepared by these known methods are, by the nature of the colloidal system, negatively charged and have insufficient substantivity for animal fibers or nylon to be applied by a process of exhaustion from a dilute bath under practical conditions. The dispersions have been applied by dipping the fabrics to be treated in a bath followed by extraction of excess liquor from the surface of the fabrics and drying. The amount of resin absorbed by the fabric in this process is directly proportional to the amount of liquor retained by the fabric from the bath.

It frequently is highly advantageous to apply resin dispersions to textile materials by a process of exhaustion from the bath onto the fiber in order to obtain economical use of the resin. This is particularly true in establishments which process goods that cannot conveniently be treated on the quetsch. For example, it is highly desirable in treating hosiery of nylon, wool, or silk as well as knitted goods in general to exhaust the resin dispersion from a long bath onto the goods. In an application of this nature the resin is entirely removed from the bath by the goods regardless of the amount of water absorbed by the goods. Hence, in this process the amount of resin absorbed by the goods is directly proportional to the amount of resin dispersed in the bath.

While dispersions of polymers of methacrylic acid esters and vinyl alcohol esters are known to produce desirable delustering, fullness and bodying on textile fabrics, their utility is limited by their cost. It has been found that a large number of natural and synthetic resins are highly soluble in methacrylate ester monomers and vinyl alcohol ester monomers and that valuable mixed polymers or interpolymers are obtained on polymerizing a methacrylic acid ester or vinyl alcohol ester monomer containing in solution a resinous material. Examples of resinous materials that are soluble in methacrylic acid ester and vinyl alcohol ester monomers are ester gum (a glyceryl ester of abietic acid), pinene-phenol resin, phenol-formaldehyde resins, alkyd resins, and cumarone-indene resins. All of these resins are either substantially cheaper than methacrylic acid esters or vinyl alcohol esters or combined with it produce unusually superior effects. Many of the cheaper resinous materials as ester gum, pinene-phenol resin, and cumarone-indene resins are colored and may become highly colored on exposure to sunlight or elevated temperatures; they are as a rule less fast to laundering on textile fabrics than the ester polymers. It has been discovered that the interpolymers or mixed polymers of these resins with methacrylic acid ester or vinyl alcohol ester derivatives are practically colorless and are quite resistant to discoloration on exposure to sunlight and to heat. The interpolymers or mixed polymers are as fast to laundering as the methacrylate or vinyl alcohol ester resins. The sizing effects obtained on textile fabrics with the mixed polymers or interpolymers are in general equal if not superior to those obtained from the methacrylate or vinyl ester polymers alone; added advantages are found in a reduction of the tendency to slip and to snag on silk hosiery and nylon hosiery. It is apparent that valuable features of the individual components in the mixed polymers or interpolymers are retained while many of the undesirable features of individual components are minimized or lost.

In carrying out the invention, an aqueous solution of a partially saponified polyvinyl acetate is agitated vigorously with a monomeric methacrylic acid ester or vinyl alcohol ester derivative containing in solution a substantial proportion of a soluble resin, with or without a plasticizer, and a small amount of benzoyl peroxide. Aluminum acetate, aluminum formate or barium chloride and either acetic acid or formic acid are added while continuing the agitation. A stable emulsion is obtained. The emulsion is heated to a temperature above 60° C. and preferably above 65° C. to induce polymerization of the emulsified monomer.

It frequently is advantageous to incorporate plasticizers in the resin phase. The incorporation of these plasticizers can be carried out without affecting the substantivity of the emulsions. Plasticizers which are particularly of value in the compositions of this invention are di-(butoxy ethyl) phthalate, butyl phthalyl butyl glycolate and di-(methyl-cyclohexyl) adipate.

The resin dispersions prepared by the above processes have the common property of being positively charged as shown by movement of the dispersed particles from the positive to the negative pole in an electric field. The resin particles are substantive to wool, silk, and nylon and are absorbed from a dilute bath by fabrics made of these materials.

The degree of substantivity of the different dispersions or the different fibers varies considerably; the affinity for wool, silk, and nylon is a variable that is strongly influenced by the pH and temperature in the bath. Generally speaking, the substantivity of the resin dispersion is greater, the higher the temperature and pH in the bath. It has been found that the pH range most suited for use in applying the dispersions to silk is 4.0 to 7.0; to wool, 4.5 to 7.0; and to nylon 4.8 to 7.0. The dispersions have a high affinity for silk, wool, or nylon in baths more alkaline than 7.0 but the dispersions are in a metastable state and frequently are adsorbed so rapidly that they are not deposited uniformly on the fibers. The dispersions have considerable affinity for the fibers at pH values smaller than those given above but the rate of adsorption of the dispersion frequently is too slow to be practical. The dispersions are highly substantive to silk, and wool at temperatures as low as 75° F.; temperatures above 100° F. are usually required for commercially satisfactory application to nylon.

The resin dispersions described herein may frequently be used to advantage in combination with positively charged paraffin wax dispersions in the finishing of wool, silk, and nylon textiles and knit goods including hosiery. The combination of resin and wax dispersions is applied by the same methods as described for the resin dispersions alone.

The following examples are illustrative of the invention but are not intended as limiting it in any way. Parts are given by weight except where it may otherwise be indicated.

EXAMPLE 1

Seven parts of ester gum and 0.14 part of benzoyl peroxide were dissolved in 14 parts of methyl methacrylate monomer. The resin solution was agitated vigorously with 2.1 parts of a partially saponified polyvinyl acetate dissolved in 72.16 parts of water by means of a high-speed mixer. The saponification number of the partially saponified polyvinyl acetate was 109 and the viscosity of a 4% aqueous solution at 20° C. was 20 centipoises. Four parts of a 32% basic aluminum acetate solution and 0.6 part of acetic acid were added while continuing the agitation. After agitating for a total of 3 minutes a stable emulsion was obtained. The emulsion was heated for 4 hours at 67° C. to obtain a stable dispersion of a resinous polymer.

0.02 part of technical dodecyl diethylcyclohexylamine sulfate can be used in the above composition in order to speed up the solution of the partially saponified polyvinyl acetate.

EXAMPLE 2

1.0 gram of the product from Example 1 was dispersed in 200 cc. of soft water; the pH of the bath was 4.6. The bath was placed in a pint Mason jar and a 10-gram silk stocking added to the jar. The bath was agitated for 10 minutes at 85° F. and 5 minutes at 100° F. The resin dispersion was almost completely absorbed by the silk stocking from the bath. The stocking was hydro-extracted, boarded and dried at about 200° F. An excellently delustered, snag-resistant stocking with good body and an attractive hand was obtained.

EXAMPLE 3

One gram of the product from Example 1 was dispersed in 200 cc. of soft water and the pH of the bath adjusted to 6.5 by the addition of ammonia. The bath was placed in a pint Mason jar and a nylon stocking weighing 10 grams was added at 120° F. The bath was agitated for 30 minutes; during this time at least 80% of the dispersion was absorbed from the bath by the stocking. The degree of absorption was judged by a comparison of the opacity of the exhausted bath with dispersions of known concentration. The stocking was hydro-extracted, boarded and dried at about 200° F. An excellently delustered stocking with markedly improved snag-resistance, good body and an attractive silk-like hand was obtained.

EXAMPLE 4

One gram of the product from Example 1 was dispersed in 200 cc. of soft water and the pH of the bath adjusted to 6.0 by the addition of ammonia. A ten-gram piece of wool serge was entered in the bath at 100° F. and agitated steadily. The dispersion was completely absorbed by the wool in about 15 minutes. The wool was hydro-extracted and dried at about 200° F. Considerable body was added to the fabric.

EXAMPLE 5

A monomer of n-butyl methacrylate was substituted for methyl methacrylate monomer in Example 1. A stable resin dispersion was obtained.

The dispersed resin was applied to wool, silk, and nylon as in Examples 2, 3, and 4. The silk and nylon stockings were only moderately delustered, were improved in snag-resistance, and had very good body and an attractive hand. Considerable body was added to the wool fabric.

EXAMPLE 6

Isobutyl methacrylate monomer was substituted for the methyl methacrylate monomer in Example 1. A stable resin dispersion was obtained.

The dispersed resin was applied to wool, silk, and nylon as in Examples 2, 3, and 4. The silk and nylon stockings were moderately delustered, greatly improved in snag-resistance, and had very good body and an attractive hand. Considerable body was added to the wool fabric.

EXAMPLE 7

Seven parts of ester gum, 0.14 parts of benzoyl peroxide and 4 parts of di-(methylcyclohexyl) adipate were dissolved in 10 parts of methyl methacrylate monomer. The resin solution was emulsified and polymerized as in Example 1 to obtain a stable resin dispersion.

The dispersed resin was applied to silk, nylon, and wool as in Examples 2, 3, and 4. The silk and nylon stockings were markedly delustered, greatly improved in snag-resistance, and had excellent body and an attractive hand. Considerable body was added to the wool fabric.

EXAMPLE 8

Butyl phthalyl butyl glycolate was substituted for di-(methylcyclohexyl) adipate in Example 7; approximately equivalent results were obtained.

EXAMPLE 9

Di-(butoxy ethyl) phthalate was substituted for (di(methylcyclohexyl) adipate in Example 7: approximately equivalent results were obtained.

EXAMPLE 10

The ester gum of Example 1 was replaced with an equal weight of a pinene-phenol condensation product. A stable dispersion was obtained. The resin dispersion when applied to silk, nylon and wool as in Examples 2, 3 and 4 exhausted excellently onto the fibers. The silk and nylon stockings were well delustered, greatly improved in snag-resistance, and had very good body. Considerable body was added to the wool fabric.

EXAMPLE 11

The ester gum of Example 1 was replaced with an equal weight of a modified phenol-formaldehyde resin. A stable dispersion was obtained. The resin dispersion exhausted excellently on silk, nylon, and wool when applied as in Examples 2, 3, and 4. The silk and nylon stockings were well delustered, markedly improved in snag-resistance and had good body with considerable crispness. Excellent body was added to the wool fabric.

EXAMPLE 12

The ester gum in Example 1 was replaced with an equal weight of a rosin modified alkyd resin. A stable resin dispersion was obtained. The resin dispersion exhausted excellently on silk, nylon and wool when applied as in Examples 2, 3 and 4. The silk and nylon stockings were moderately delustered, considerably improved in snag-resistance and had good body. Good body was added to the wool fabric.

EXAMPLE 13

The ester gum in Example 1 was replaced by an equal weight of a cumarone-indene resin. A stable dispersion was obtained. The resin dispersion exhausted excellently on silk, nylon and wool when applied as in Examples 2, 3 and 4. The silk and nylon stockings were noticeably delustered, markedly improved in snag-resistance and had noticeably greater body. Noticeable body was added to the wool fabric.

EXAMPLE 14

The ester gum in Example 1 was replaced by an equal weight of polyvinyl acetate resin. A stable dispersion was obtained. The resin dispersion exhausted excellently on silk, nylon and wool when applied as in Examples 2, 3 and 4. The silk and nylon stockings were excellently delustered, markedly improved in snag-resistance and had very good body with a crisp hand. Excellent body was added to the wool fabric.

EXAMPLE 15

*Composition A*

| | Per cent |
|---|---|
| Refined paraffin wax | 16.7 |
| Actate of deacetylated chitin | 1.3 |
| Basic aluminum acetate | 3.0 |
| Acetic acid | 0.5 |
| Technical dodecyl diethylcyclohexylamine sulfate | 0.09 |
| Water | 78.41 |

One gram of the product from Example 1 and 0.5 gram of composition (see above) were dispersed in 200 cc. of soft water. The pH of the bath was adjusted to 6.0 by the addition of ammonia. The bath was placed in a pint Mason jar and a 10-gram silk stocking added to the jar. The bath was agitated for 10 minutes at 85° F. and 5 minutes at 100° F. The resin dispersion was completely absorbed by the silk stocking from the bath. The stocking was hydro-extracted, boarded and dried at about 200° F. An excellently delustered, snag-resistant, water-repellent stocking with excellent body was obtained.

EXAMPLE 16

The ester gum in Example 5 was substituted by a pinene-phenol condensation product. A stable resin dispersion was obtained.

The dispersed resin was applied to silk, nylon and wool as in Examples 2, 3, and 4. The silk and nylon stockings were markedly improved in snag resistance, and had excellent body. Considerable body was added to the wool fabric.

EXAMPLE 17

The ester gum in Example 5 was substituted by a tertiary butyl phenol-formaldehyde resin. A stable resin dispersion was obtained.

The dispersed resin when applied to silk and nylon stockings as in Examples 2 and 3 markedly improved the snag-resistance and body. The resin when applied to wool as in Example 4 added considerable body to the fabric.

EXAMPLE 18

The ester gum in Example 5 was substituted by a rosin modified alkyd resin. A stable dispersion was obtained.

The dispersed resin when applied as in Example 17 produced similar results.

Example 19

The ester gum in Example 5 was substituted by a coumarone-indene resin. A stable resin dispersion was obtained. The dispersed resin when applied as in Example 17 produced similar results.

Example 20

The methyl methacrylate monomer in Example 1 was substituted by 6 parts of methyl methacrylate monomer and 6 parts of n-butyl methacrylate monomer. A stable resin dispersion was obtained. The dispersed resin when applied as in Examples 2 and 3 to silk and nylon stockings improved the snag-resistance markedly and also improved the fullness and body. Increased fullness was obtained on a wool fabric treated as in Example 4.

Example 21

Seven parts of hydrogenated ester gum were dissolved in 14 parts of vinyl acetate monomer containing 0.14 part of benzoyl peroxide. The solution was emulsified by high speed mixing with 73.96 parts of an aqueous solution containing 2.1 parts of partially saponified polyvinyl acetate and 0.02 part of technical dodecyl diethylcyclohexylamine sulfate. The saponification number of the polyvinyl acetate was 180 and the viscosity for a 4% aqueous solution at 20° C. was 40 c. p. 4.5 parts of a 32% basic aluminum acetate solution and 0.7 part of acetic acid were added while continuing the agitation for 3 minutes. The emulsion was aged 6 hours at 67° C. to obtain a stable dispersion of a resinous polymer.

The dispersion was applied to silk, nylon and wool as in Examples 2, 3 and 4. The snag-resistance of the stockings was markedly improved and their fullness of hand was excellent. The fullness of the wool fabric was markedly improved.

Example 22

Equal parts of aluminum formate and formic acid were substituted for the aluminum acetate and acetic acid in Example 1. Similar results were obtained. The product applied to silk, nylon and wool as in Examples 2, 3 and 4 behaved in a manner similar to the product of Example 1.

Example 23

An equal weight of barium chloride was substituted for the aluminum acetate in Example 1. Similar results were obtained. The product exhausted onto silk, nylon and wool when applied as in Examples 2, 3 and 4.

Example 24

A batch of 50 lbs. of dyed nylon hosiery was finished in a 50 lb. Smith-Drum rotary type machine with 7.5 lbs. of the product from Example 7. The product was added to the loaded machine at 80° F. and the bath agitated for 5 minutes. The pH of the bath was adjusted to 6.8 by the addition of aqueous ammonia. The temperature of the bath was raised to 120° F. in 5 minutes and agitation continued for 20 minutes at 120–125° F. About 90% of the dispersion was exhausted from the bath onto the stockings. The stockings were hydro-extracted, then boarded and dried on steam-heated forms. The stockings obtained had excellent body and fullness, high snag-resistance, and were delustered.

The snag-resistance of stockings taken from the batch was substantially unchanged on washing for 30 minutes at 120° F. in a 0.5% soap solution.

Example 25

A batch of 100 lbs. of dyed silk stockings was finished in a 100 lb. Smith-Drum rotary type machine with 10 lbs. of the product from Example 1 and 5 lbs. of Composition A. The dispersions were added to the loaded machine at 75° F. and the bath agitated for 10 minutes. The temperature of the bath was then raised to 100° F. and agitation continued for 5 minutes. About 90% of the dispersed phase was exhausted from the bath onto the stockings. The final pH of the bath was 6.0. The stockings were hydro-extracted, then boarded and dried on steam-heated forms. The stockings obtained had excellent body and fullness, were of improved sheer appearance, had high snag-resistance, were delustered, and had excellent water-repellency.

Stockings taken from the batch were given 10 repeated washings in a 0.5% soap solution at 105° F. The stockings were washed 2 minutes by hand, then rinsed and dried in each test. The washed stockings were highly delustered, of sheer appearance, and resistant to spotting. The dye on the treated stockings was much faster to laundering than the dye on similar untreated stockings.

Other vinylidene compounds may be used to replace the methacrylate derivatives and the vinyl acetate used in this invention. For example, butadiene and its derivatives, styrene, vinyl esters, acrylates, acrylamides, methacrylamides, acrylonitriles, and methacrylonitriles may be used alone or as mixed solvents for the resins. The resins to be dissolved in the monomers may include rosin and its derivatives, dammar gums, alkyd and modified alkyd resins, phenol-formaldehyde and modified phenol-formaldehyde resins, and coumarone-indene resins.

Other substantially non-polar high molecular weight water-soluble protective colloids may be used in place of partially saponified polyvinyl acetate. In place of partially saponified polyvinyl acetate there may be used cellulose derivatives such as water-soluble methyl cellulose, the ethylene oxide reaction product of oleyl alcohol, etc.

The positive charge on the dispersed particles may be obtained by the addition of water-soluble heavy metal or multivalent salts instead of aluminum acetate to the emulsions. For example, salts of barium, cadmium, cobalt, iron, nickel, manganese, zinc, tin, lead, antimony, bismuth and chromium can be used. Formic, propionic, hydrochloric, sulphuric and other acids may be used to replace acetic acid in the emulsions. It is preferable to add the heavy metal salts during the process of emulsification; however, satisfactory substantive emulsions can be obtained by adding the heavy metal salts or salts of multivalent metals to the aged dispersions.

The primary use of products described in this invention is for finishing hosiery to improve the wear of the stockings.

The compositions described in this invention are also useful as sizes for general use in the textile field and on paper. The compositions produce slip-resistant finishes on textiles and increase the wet strength of paper. They may be used to produce durable wash-resistant, starch-like finishes on textiles. The finishes may be used in sizing textiles alone or as binders for fillers as starch, dextrin, gums, talc, clay, etc. The finishes are valuable for producing snag-resistant and slip-resistant finishes on nylon and silk piece goods as well as knitted fabrics.

The resin dispersions described herein produce finishes on silk hosiery that greatly improve the appearance and durability of the stockings. These finishes are very durable and fast to washing. These resin dispersions give an excellent delustering effect and make hosiery fabrics more sheer in appearance. It is possible to obtain a very uniform and reproducible finish from these resin dispersions. The finishes described herein provide considerable improved snag-resistance on hosiery and slip-resistance on fabrics. These resin dispersions alone or in combination with positively charged substantive wax dispersions produce a bodying effect and pleasing hand on nylon hosiery, knit goods and flat goods.

The subjoined claims are intended to cover not only the products described herein but to generically cover certain products which are described and specifically claimed in my copending application, Serial Number 351,087 filed on this same day, to which reference may be made for further disclosure. The resin dispersions described and specifically claimed in the aforesaid copending application include cationic surface active agents which affect the substantivity of these resin dispersions.

The above description and examples are intended to be illustrative only and not to limit the scope of the invention. Any departure therefrom which conforms to the spirit of the invention is intended to be included within the scope of the appended claims.

I claim:

1. A substantive textile finishing composition adapted for sizing and finishing textile fibers comprising a stable aqueous dispersion of a polymerized vinylidene compound containing intimately incorporated in said polymer a resin which does not contain the vinylidene group, said composition containing as the dispersing agent a non-polar high molecular weight water soluble protective colloid of the class consisting of partially saponified polyvinyl esters water soluble methyl celluloses and the ethylene oxide reaction product of oleyl alcohol, and containing as an agent which renders the dispersed vinylidene compound and resin substantive to textile fibers, a water soluble salt of a multivalent metal.

2. A substantive textile finishing composition adapted for sizing and finishing textile fibers comprising a stable aqueous dispersion of a polymerized vinyl acetate containing intimately incorporated in said polymer a resin which does not contain the vinylidene group, said composition containing as the dispersing agent a non-polar high molecular weight water soluble protective colloid of the class consisting of partially saponified polyvinyl esters water soluble methyl celluloses and the ethylene oxide reaction product of oleyl alcohol, and containing as an agent which renders the dispersed vinyl acetate and resin substantive to textile fibers, a water soluble salt of a multivalent metal.

3. A substantive textile finishing composition adapted for sizing and finishing textile fibers comprising a stable aqueous dispersion of a polymerized alkyl methacrylate containing intimately incorporated in said polymer a resin which does not contain the vinylidene group, said composition containing as the dispersing agent a non-polar high molecular weight water soluble protective colloid of the class consisting of partially saponified polyvinyl esters water soluble methyl celluloses and the ethyene oxide reaction product of oleyl alcohol, and containing as an agent which renders the dispersed alkyl methacrylate and resin substantive to textile fibers, a water soluble salt of a multivalent metal.

4. A substantive textile finishing composition adapted for sizing and finishing textile fibers comprising a stable aqueous dispersion of a polymerized vinylidene compound containing intimately incorporated in said polymer a resin which does not contain the vinylidene group, said composition containing as the dispersing agent a water soluble partially saponified polyvinyl acetate, and containing as an agent which renders the dispersed vinylidene compound and resin substantive to textile fibers, a water soluble salt of a multivalent metal.

5. A substantive textile finishing composition adapted for sizing and finishing textile fibers comprising a stable aqueous dispersion of a polymerized n-butyl methacrylate containing intimately incorporated in said polymer a resin which does not contain the vinylidene group, said composition containing as the dispersing agent a water soluble partially saponified polyvinyl acetate, and containing as an agent which renders the dispersed n-butyl methacrylate and resin substantive to textile fibers, a water soluble salt of a multivalent metal.

6. A substantive textile finishing composition adapted for sizing and finishing textile fibers comprising a stable aqueous dispersion of a polymerized methyl methacrylate containing intimately incorporated in said polymer a resin which does not contain the vinylidene group, said composition containing as the dispersing agent a water soluble partially saponified polyvinyl acetate, and containing as an agent which renders the dispersed methyl methacrylate and resin substantive to textile fibers, a water soluble salt of a multivalent metal.

7. A substantive textile finishing composition adapted for sizing and finishing textile fibers comprising a stable aqueous dispersion of a polymerized vinyl acetate containing intimately incorporated in said polymer a resin which does not contain the vinylidene group, said composition containing as the dispersing agent a water soluble partially saponified polyvinyl acetate, and containing as an agent which renders the dispersed vinyl acetate and resin substantive to textile fibers, a water soluble salt of a multivalent metal.

8. A substantive textile finishing composition adapted for sizing and finishing textile fibers comprising a stable aqueous dispersion of a polymerized vinylidene compound containing intimately incorporated in said polymer a resin which does not contain the vinylidene group, said composition containing as the dispersing agent a non-polar high molecular weight water soluble protective colloid of the class consisting of partially saponified polyvinyl esters water soluble methyl celluloses and the ethylene oxide reaction product of oleyl alcohol, and containing as an agent which renders the dispersed vinylidene compound and resin substantive to textile fibers, a water soluble aluminum salt.

9. A substantive textile finishing composition adapted for sizing and finishing textile fibers comprising a stable aqueous dispersion of a polymerized vinyl acetate containing intimately incorporated in said polymer a resin which does not contain the vinylidene group, said composition containing as the dispersing agent a non-polar high molecular weight water soluble protective colloid of the class consisting of partially saponified polyvinyl esters water soluble methyl celluloses and the ethylene oxide reaction product of oleyl alcohol and containing as an agent which renders the dispersed vinyl acetate and resin substantive to textile fibers, a water soluble aluminum salt.

10. A substantive textile finishing composition adapted for sizing and finishing textile fibers comprising a stable aqueous dispersion of a polymerized alkyl methacrylate containing intimately incorporated in said polymer a resin which does not contain the vinylidene group, said composition containing as the dispersing agent a non-polar high molecular weight water soluble protective colloid of the class consisting of partially saponified polyvinyl esters water soluble methyl celluloses and the ethylene oxide reaction product of oleyl alcohol, and containing as an agent which renders the dispersed alkyl methacrylate and resin substantive to textile fibers, a water soluble aluminum salt.

11. A substantive textile finishing composition adapted for sizing and finishing textile fibers comprising a stable aqueous dispersion of a polymerized vinylidene compound containing intimately incorporated in said polymer an ester gum, said composition containing as the dispersing agent a water soluble partially saponified polyvinyl acetate, and containing as an agent which renders the dispersed vinylidene compound and ester gum substantive to textile fibers, a water soluble aluminum salt.

12. A substantive textile finishing composition adapted for sizing and finishing textile fibers comprising a stable aqueous dispersion of a polymerized vinyl acetate containing intimately incorporated in said polymer an ester gum, said composition containing as the dispersing agent a water soluble partially saponified polyvinyl acetate, and containing as an agent which renders the dispersed vinyl acetate and ester gum substantive to textile fibers, a water soluble aluminum salt.

13. A substantive textile finishing composition adapted for sizing and finishing textile fibers comprising a stable aqueous dispersion of a polymerized alkyl methacrylate containing intimately incorporated in said polymer an ester gum, said composition containing as the dispersing agent a water soluble partially saponified polyvinyl acetate, and containing as an agent which renders the dispersed alkyl methacrylate and ester gum substantive to textile fibers, a water soluble aluminum salt.

14. A substantive textile finishing composition adapted for sizing and finishing textile fibers comprising a stable aqueous dispersion of a polymerized n-butyl methacrylate containing intimately incorporated in said polymer an ester gum, said composition containing as the dispersing agent a water soluble partially saponified polyvinyl acetate, and containing as an agent which renders the dispersed n-butyl methacrylate and ester gum substantive to textile fibers, a water soluble aluminum salt.

15. A substantive textile finishing composition adapted for sizing and finishing textile fibers comprising a stable aqueous dispersion of a polymerized methyl methacrylate containing intimately incorporated in said polymer an ester gum, said composition containing as the dispersing agent a water soluble partially saponified polyvinyl acetate, and containing as an agent which renders the dispersed methyl methacrylate and ester gum substantive to textile fibers, a water soluble aluminum salt.

JOSEPH EDWARD SMITH.